United States Patent
Weimer et al.

(10) Patent No.: US 8,764,921 B2
(45) Date of Patent: Jul. 1, 2014

(54) APPARATUS AND PROCESS FOR AUTOMATIC, CONTINUOUS PRODUCTION OF PREFORMS

(75) Inventors: Christian Weimer, München (DE); Frank Weiland, München (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 305 days.

(21) Appl. No.: 13/233,215

(22) Filed: Sep. 15, 2011

(65) Prior Publication Data

US 2012/0085480 A1 Apr. 12, 2012

(30) Foreign Application Priority Data

Oct. 7, 2010 (EP) .................................. 10400051

(51) Int. Cl.
*B32B 37/00* (2006.01)
(52) U.S. Cl.
USPC ............ 156/64; 156/73.1; 156/267; 156/358; 156/510; 156/580.1
(58) Field of Classification Search
USPC .................. 156/64, 73.1, 250, 267, 358, 510, 156/580.1, 580.2; 264/442, 443, 444, 445; 425/174.2
See application file for complete search history.

(56) References Cited

U.S. PATENT DOCUMENTS

| | | | |
|---|---|---|---|
| 4,404,052 A | 9/1983 | Persson | |
| 5,167,754 A | 12/1992 | Lutzow | |
| 6,432,236 B1 | 8/2002 | Leemon | |
| 7,371,297 B2 * | 5/2008 | Caroli | 156/64 |
| 7,887,656 B2 * | 2/2011 | Yamamoto | 156/73.1 |
| 2004/0011204 A1 | 1/2004 | Both | |
| 2010/0116409 A1 | 5/2010 | Yamamoto | |

FOREIGN PATENT DOCUMENTS

| | | |
|---|---|---|
| CA | 2041018 C | 7/2000 |
| DE | 3921364 A1 | 1/1991 |
| DE | 4105013 A1 | 8/1992 |
| EP | 0405184 B1 | 4/1995 |
| JP | 05131174 A | 5/1993 |
| WO | 2007003626 A1 | 1/2007 |
| WO | 2009156754 A1 | 12/2009 |

OTHER PUBLICATIONS

Search Report and Written Opinion; Application No. EP 10400051; dated Aug. 5, 2011.
Branson Ultrasonic Radial Actuator, Data Sheet PW-48, www.Branson-PlasticsJoin.com, Branson Ultrasonics Corporation, 2000, 2 Pages.
Herrmann Ultraschall—Grundlagen—Herrmann Ultraschalltechnik, http://www.herrmannultraschall.com/fundamentals-nonwovens.html, Dated May 8, 2010, 3 Pages.

* cited by examiner

*Primary Examiner* — James Sells
(74) *Attorney, Agent, or Firm* — Brooks Kushman P.C.

(57) ABSTRACT

An apparatus and a process for automatic, continuous production of preforms from dry fabrics containing a thermoplastic binder element by feeding individual layers (7-9) of dry fabrics towards an ultrasonic unit (13), applying ultrasonic energy from said ultrasonic unit (13) to said more than one layers (7-9) of dry fabrics applying pressure to said more than one layers (7-9) of dry fabrics containing a thermoplastic binder element while the binder element is activated by means of said ultrasonic energy in said ultrasonic unit (13), to create a consolidated, stiff laminate (18) and cutting said consolidated, stiff laminate (18) to a preform.

15 Claims, 1 Drawing Sheet

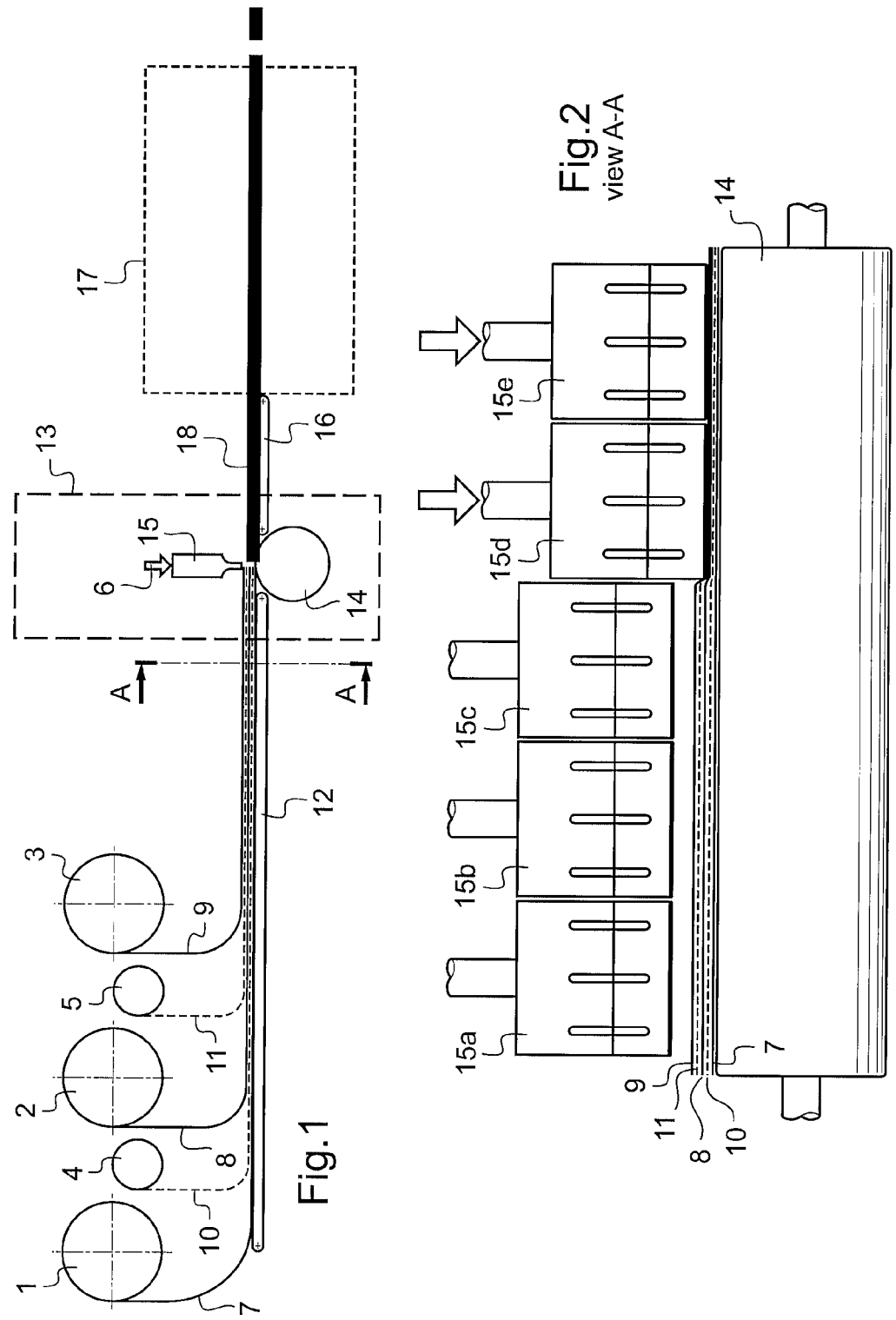

US 8,764,921 B2

APPARATUS AND PROCESS FOR AUTOMATIC, CONTINUOUS PRODUCTION OF PREFORMS

CROSS REFERENCE TO RELATED APPLICATION

This application claims the benefit of EP 10 400051.8 filed on Oct. 7, 2010, the disclosure of which is incorporated in its entirety by reference herein.

BACKGROUND OF THE INVENTION (1) Field of the Invention

The invention is related to an apparatus for automatic, continuous production of preforms according to the preamble of claim 1 and to a process for automatic, continuous production of preforms with such an apparatus according to the preamble of claim 6.

(2) Description of Related Art

Definitions

Preforming routines can be divided into direct and sequential preforming routines.

Direct preforming routines like "Fiber Placement" or "Tailored Fiber Placement" allow a customized positioning of fiber bundles (rovings) but imply a low material deposition speed.

Sequential Preforming routines mostly use the stitching technology, the binder technology or a combination of both to process fabrics from rolls. The stitching routine is a highly automated, sequential process. In order to enable a compaction of the preform over the whole surface ("final-thickness-compaction") by means of stitching, a high seam density has to be chosen, which results in a high degree of fiber distortion and a long process time. Within the Binder routine the preform needs to be compacted and heated up above the binder softening temperature at usually ~100° C. The compaction is done with a mostly non-reusable vacuum bagging which is applied manually. The binder activation is a time and energy consuming step which is conducted in a convection oven or infrared field.

The document WO 2009156754 (A1) discloses a method of fabricating a fibre reinforced thermoplastic composite structure comprising: placing a first layer of fibre reinforced thermoplastic material on top of a second layer of fibre reinforced thermoplastic material; providing a local heating source and locally heating a portion of at least the upper layer of thermoplastic composite material; and providing an ultrasonic transducer and locally introducing ultrasonic energy waves to the heated portion of the thermoplastic material such that ultrasonic consolidation of the fibre reinforced thermoplastic occurs.

The document U.S. Pat. No. 4,404,052 (A) discloses a method and apparatus for bonding together a plurality of juxtaposed webs which are subject to being ultrasonically bonded together to form a laminate as the webs are being driven forward at a relatively high velocity. The regions of the webs to be bonded are subjected to progressively increasing compressive forces while simultaneously being subjected to ultrasonic energy as they traverse an elongate portion of a predetermined path at a predetermined velocity. After the regions are ultrasonically bonded they may be subjected to another compression prior to the bonds becoming fully set upon cooling. The method may be practiced in an apparatus which includes an ultrasonic horn and an anvil which are configured and disposed to define a bonding passageway having an elongate convergent portion; and the apparatus may include a pressure roll biased towards the anvil adjacent the downstream end of the passageway. A face of the ultrasonic horn is so curved in the machine direction that the passageway has a convergent-divergent arcuate shape; the entrance to the passageway is sufficiently high to obviate web-splice induced jams.

The document DE 4105013 A1 describes a process and apparatus to weld endless material quasi-continuously using ultrasonic technology with a rotating anvil. The material is transported intermittent; there is no relative movement between horn and material during welding.

The document U.S. Pat. No. 6,432,236 describes a method to fabricate a composite structure by using ultrasonic technology and fiber reinforced tapes with a thermosetting matrix. The material is laid up under pressure and under induction of ultrasound in order to suppress voids/air entrapment. The ultrasonic unit is moved along the composite structure for consolidation.

The document WO 2007/003626 A1 describes a method to assemble rigid fiber reinforced thermoplastic parts by means of ultrasonic welding. In order to ensure a softening of the material in the interface, energy directors are brought into the interface.

Neither of the cited methods and apparatuses is suitable to automatically and continuously produce preforms for components of fiber reinforced plastics.

SUMMARY OF THE INVENTION

It is an object of the invention to provide for an apparatus and a process for automatic, continuous production of final-thickness-preforms with reduced production costs and reduced energy consumption. Final thickness means, no further compaction of the preform is needed prior to infusion.

The solution is provided with an apparatus for automatic, continuous production of preforms with the features of claim 1 and a process for automatic, continuous production of preforms with the features of claim 6.

According to the invention an apparatus is provided for automatic, continuous production of preforms from fabrics and a thermoplastic binder element with an ultrasonic unit with a rotatable driven anvil roll. At least one fabric roll with preferably dry fabrics is provided for supplying an individual layer from each of said at least one fabric roll and at least one roll of said thermoplastic binder element is provided for supplying each one individual layer of binder element from each of said binder rolls, said at least one fabric roll and at least one roll being arranged to feed said at least one individual layer of binder element between, essentially in parallel and in close contact to the adjacent individual layers of dry fabric from said at least one fabric roll and at least one roll towards the ultrasonic unit comprising a battery of ultrasonic horns, said ultrasonic unit being adapted to apply ultrasonic energy to said at least one layer of dry fabrics and said at least one layer of binder element to activate the binder element by means of said ultrasonic energy. A conveyor belt is provided for supporting the at least one layer of dry fabric and the at least one layer of binder element with less strain from said at least one fabric roll and at least one roll towards the ultrasonic unit and further provided are preferably tunable pressurizing means for applying pressure to said at least one layer of dry fabrics and said at least one layer of binder element via said ultrasonic horns in said ultrasonic unit while the binder is activated by means of said ultrasonic energy from said ultrasonic unit to produce a stiff laminate. Control means control said pressurizing means during activation of said ultrasonic unit in order to adjust the stiff laminate to a consolidated stiff laminate of predetermined thickness, and cutting means are provided for cutting the consolidated stiff laminate to a final shape of the preform.

According to a preferred embodiment of the invention a further conveyor belt is provided for supporting the preferably consolidated stiff laminate behind the ultrasonic unit.

According to a further preferred embodiment of the invention the thermoplastic binder element is a veil or a film.

According to a further preferred embodiment of the invention the dry fabrics of the at least one fabric roll contain binder material.

According to a further preferred embodiment of the invention the ultrasonic unit is provided with separate ultrasonic horns said horns being controlled individually by said tunable pressurizing means.

According to a preferred embodiment of the invention a process for automatic, continuous production of preforms from dry fabrics and separate binder layers or, alternatively, fabrics containing binder (e.g. molten powder) is provided. The process provides more than one fabric roll with said dry fabrics containing thermoplastic binder, —preferably in a width of ~1200 mm—, supplying individual layers of said dry fabrics and binder elements from each of said more than one fabric rolls and feeding said more than one individual layers of said dry fabrics and said binder elements essentially in parallel and in close contact to each other from said more than one fabric roll towards an ultrasonic unit. Ultrasonic energy is applied from said ultrasonic unit to said more than one layers of dry fabrics and binder element to activate the binder by means of said ultrasonic energy and pressure is applied to said more than one layers of dry fabrics and binder element while the binder is activated by means of said ultrasonic energy in said ultrasonic unit, to create a stiff laminate, consolidated to final thickness for a preform in less time and while consuming less energy for the inventive process for automatic, continuous production of preforms than for any of the thermoplastic routines according to the cited state of the art, said routines welding one layer onto a substrate, laminate or tool. The inventive process allows increased processing speed, full automation and a compact arrangement with small place requirement making it flexible to be integrated into a production line. The proposed invention is a solution to the demand for a continuous and fully automated net thickness preform production for flat and slightly curved components. It comprises the use of a deposition system for fiber mats and binder, an ultrasonic welding unit and a cutter table, with the ultrasonic welding unit being the central component of the inventive process.

According to a preferred embodiment of the invention the consolidated, stiff laminate subsequently cools down within a few minutes, is, cut in final shape of a flat preform, picked up and placed into a mould for further processing, namely for resin infusion.

According to a further preferred embodiment of the invention a stack of more than two layers of dry fabrics and more than one layer of binder is provided.

BRIEF DESCRIPTION OF THE DRAWINGS

A preferred embodiment of the invention is shown by way of the following description with reference to the attached drawings.

FIG. 1 shows a schematic view of a cross section of an apparatus for automatic, continuous production of preforms according to the invention, and FIG. 2 shows a schematic view of a cross section along a line A-A of FIG. 1 of the inventive apparatus.

DETAILED DESCRIPTION OF THE PREFERRED EMBODIMENTS

According to FIG. 1 an apparatus with a length of less than 3 m for automatic, continuous production of preforms comprises three fabric rolls 1-3 each providing an individual layer 7-9 of dry fabric and two rolls 4, 5 each providing a layer of binder 10, 11 with a width of ~1200 mm each. The individual layers 7-9 of dry fabric and the layers of binder 10, 11 are supplied in parallel and in close contact to each other from said fabric rolls 1-3 and said binder rolls 4, 5 towards an ultrasonic unit 13 with each binder layer 4, 5 being placed between two fabric layers 7-9 and all of said layers 7-11 being supported by a conveyor belt 12.

The layers 7-11 from the rolls 1-5 may constitute fabrics containing binder, e.g. molten powder.

The ultrasonic unit 13 comprises a rotatable driven anvil roll 14 and a battery 15 of ultrasonic horns 15a-15e for emission of ultrasonic energy towards the three individual layers 7-9 of dry fabric and the two individual layers of binder element 10, 11 to activate the binder elements 10, 11 during passage of said layers 7-11 through the ultrasonic unit 13.

Controllable pressure means 6 are provided to individually actuate the ultrasonic horns 15a-15e in order to press the three individual layers 7-9 of dry fabric and the two individual layers of binder element 10, 11 during their passage through the ultrasonic unit 13 against the anvil roll 14 while simultaneously the binder element is activated by the ultrasonic energy from the ultrasonic horns 15a-15e to process said layers 7-11 to a consolidated stiff laminate 18.

Subsequent to the ultrasonic unit 13 a further conveyor belt 16 is provided for support of the consolidated stiff laminate 18. Cutting means 17 are provided to process the consolidated stiff laminate 18 to a preform, said cutting means 17 being arranged between the ultrasonic unit 13 and a mould (not shown) for further processing of the preform to produce a component of fiber reinforced plastics.

FIG. 2: The battery 15 of ultrasonic horns 15a-15e of the ultrasonic unit 13 comprises a plurality of separate horns 15a-15e, arranged in line with each other. Each of said ultrasonic horns 15a-15e is controlled individually for individual emission of ultrasonic energy and said controllable pressurizing means 6 applies individually pressure to a selection of said ultrasonic horns 15a-15e. In one configuration the separate horns 15a-15c are in standby-mode in distance to the layers 7-11 and said area remains in a genuine unmodified condition while the ultrasonic horns 15d-15e under pressure from said controllable pressurizing means 6 are actively inducing ultrasonic energy to the layers 7-11 with binder element to form an area of stiff laminate 18.

Process to Operate the Apparatus

In operation of the automated production line the three fabric layers 7-9 and the two individual binder layers 10-11 are fed individually from the fabric rolls 1-3 and the binder rolls 4, 5 into between the rotatable driven anvil roll 14 and the ultrasonic horns 15. The three fabric layers 7-9 and the two binder layers 10-11 are processed between the rotatable driven anvil roll 14 and the ultrasonic horns 15 and as a consequence the continuous rotation of the anvil roll 14 continuously conveys the three fabric layers 7-9 and the two binder layers 10-11 from the fabric rolls 1-3 and the two binder rolls 4, 5 through the ultrasonic unit 13. The layers 7-11 are transported on additional conveyor belts 12 and 16 before and after the ultrasonic unit 13.

The ultrasonic horns 15a-15e provide for the emission of ultrasonic energy towards the three individual layers 7-9 of dry fabric with the two layers of binder 10-11 to activate the binder, to create a stiff laminate 18. The ultrasonic horns 15a-15e are individually controllable in order to activate only predetermined areas of the binder elements.

During the ultrasonic activation the three fabric layers 7-9 and the binder layers 10-11 are passing through the ultrasonic unit 13 under pressure from individual horns 15a-15e, to create a consolidated, stiff laminate 18 compacted to final thickness with no further compacting step being necessary. The consolidated, stiff laminate 18 is cut in a cutting device 17 and the produced preform can due to its high stiffness and rigidity be picked up easily by means of automated handling systems and placed into a cutting device 17 for further processing, namely for resin infusion for components of fiber reinforced plastics.

What is claimed is:

1. An apparatus for automatic, continuous production of a preform, the apparatus having an ultrasonic unit with a rotatable driven anvil roll, the ultrasonic unit comprising a battery of ultrasonic horns and being adapted to apply ultrasonic energy; pressurizing means for applying pressure via the battery of ultrasonic horns; and cutting means for cutting the preform to a final shape wherein the apparatus further has:
   a) at least two fabric rolls having dry fabrics for supplying individual layers of dry fabric from each of the fabric rolls;
   b) at least one binder roll of thermoplastic binder element supplying one individual layer of binder element from the binder rolls, the at least two fabric rolls and the binder roll being arranged to feed the at least one individual layer of binder element between, essentially in parallel and in close contact to the adjacent individual layers of dry fabric from the fabric rolls and the binder roll, towards the ultrasonic unit, the ultrasonic unit being adapted to apply ultrasonic energy to the layers of dry fabrics and the layer of binder element to activate the binder element by means of the ultrasonic energy;
   c) a conveyor belt for supporting the two layers of dry fabric and the layer of binder element, the conveyor belt applying with strain the two layers of dry fabric and the layer of binder element, with less strain from the two fabric rolls and the binder roll towards the ultrasonic unit;
   d) pressurizing means for applying individual pressure to the two layers of dry fabric and the layer of binder element via the ultrasonic horns while the binder is activated by means of the ultrasonic energy from the ultrasonic horns to produce a stiff laminate, the pressurizing means being tunable and the stiff laminate having a thickness and;
   e) control means for controlling the pressurizing means during activation of the ultrasonic unit in order to adjust the thickness of the stiff laminate to a consolidated stiff laminate of predetermined thickness.

2. The apparatus according to claim 1, wherein a further conveyor belt is provided for supporting the consolidated stiff laminate behind the ultrasonic unit.

3. The apparatus according to claim 1, wherein the thermoplastic binder element is a veil or a film.

4. The apparatus according to claim 1, wherein the dry fabrics of the two fabric rolls contain a binder material.

5. The apparatus according to claim 1, wherein the ultrasonic horns comprise a plurality of ultrasonic horns individually controlled by the tunable pressurizing means.

6. A process for automatic, continuous production of a preform, the apparatus having: an ultrasonic unit with a rotatable driven anvil roll, the ultrasonic unit comprising a battery of ultrasonic horns and being adapted to apply ultrasonic energy; and cutting means for cutting the preform to a final shape; wherein the apparatus further has:
   a) at least two fabric rolls having dry fabrics for supplying layers of dry fabric from each fabric roll; each layer of fabric being adjacent one another;
   b) at least one binder roll of thermoplastic binder element supplying one layer of binder element from the binder roll, the at least two fabric rolls and the binder roll being arranged to feed the layer of binder element between the layers of dry fabric, the ultrasonic unit being adapted to apply ultrasonic energy to the two layers of dry fabrics and to the layer of binder element, to activate the binder element by means of the ultrasonic energy;
   c) a conveyor belt for supporting the two layers of dry fabric and the layer of binder element; the conveyor belt underlying the layers of dry fabrics and the layer of binder element;
   d) pressurizing means for applying pressure to the two layers of dry fabrics and to the layer of binder element via the ultrasonic horns while the binder is activated by means of the ultrasonic energy from the ultrasonic horns to produce a stiff laminate; the pressurizing means being tunable and the still laminate having a thickness; and
   control means for controlling the pressurizing means during activation of the ultrasonic unit in order to adjust the thickness stiff laminate to a consolidated stiff laminate of predetermined thickness, wherein the process comprises:
   a) providing the dry fabrics from the at least two fabric rolls with dry fabrics,
   b) providing the binder element from the at least binder roll,
   c) supplying as an individual layer each layer of dry fabric from the fabric rolls and supplying as an individual layer each layer of binder element from the binder rolls and feeding the individual layers of dry fabrics and the individual layer of binder element essentially in parallel and in close contact to each other from the fabric and binder rolls;
   d) supplying the individual layers of dry fabric and the individual layer of binder element strainlessly by means of the underlying conveyor belt towards an ultrasonic unit;
   e) applying ultrasonic energy from the ultrasonic unit to the at least two layers of dry fabric and to the layer of binder element to activate the binder element so as to have the ultrasonic energy create a stiff laminate from the layers of dry fabric and the layer of binder element;
   f) applying controlled pressure to the two layers of dry fabric and to the layer of binder element while ultrasonic energy is activating the binder in the ultrasonic unit, to consolidate the stiff laminate layers; and
   g) cutting the consolidated, stiff laminate to form a preform.

7. The process according to claim 6, wherein after cutting the consolidated stiff laminate preform, the process further comprises picking the preform and placing the preform into a mould for further processing.

8. The process according to claim 6, wherein at steps a) and b), more than two layers of dry fabric and more than one layer of binder are provided in a stack.

9. The process according to claim 6, wherein at step b), the binder element is provided as a prebindered fabric from a prebindered fabric roll.

10. The process according to claim 6, wherein the ultrasonic unit has segments and wherein the pressurizing means are controlling the segments of the ultrasonic unit individually by means of the pressurizing means.

11. A process for automatic, continuous production of preforms with an apparatus, the apparatus comprising:
   a) at least one fabric roll with dry fabrics for supplying an individual layer of dry fabric from each of said at least one fabric roll;
   b) at least one roll of thermoplastic binder element supplying each one individual layer of binder element from each of said binder rolls, said at least one fabric roll and at least one roll being arranged to feed said at least one individual layer of binder element between, essentially in parallel and in close contact to the adjacent individual layer of dry fabric from said at least one fabric roll and at least one roll towards the ultrasonic unit, said ultrasonic unit comprising a battery of ultrasonic horns, said ultrasonic unit being adapted to apply ultrasonic energy to said at least one layer of dry fabrics and said at least one layer of binder element to activate the binder element by means of said ultrasonic energy;
   c) a conveyor belt for supporting the at least one layer of dry fabric and the at least one layer of binder element with less strain from said at least one fabric roll and at least one roll towards the ultrasonic unit;
   d) tunable pressurizing means for applying pressure to said at least one layer of dry fabrics and said at least one layer of binder element via said ultrasonic horns while the binder is activated by means of said ultrasonic energy from said ultrasonic horns to produce a stiff laminate;
   e) control means for controlling said pressurizing means during activation of said ultrasonic unit in order to adjust the stiff laminate to a consolidated stiff laminate of predetermined thickness, and
   f) cutting means for cutting the consolidated stiff laminate to a final shape of the preform;
   said process comprising:
   a) providing at least one fabric roll with dry fabrics,
   b) providing at least one roll of binder element,
   c) supplying an individual layer of dry fabric from each of said more than one fabric rolls and one individual layer of binder element from each of said binder rolls and feeding said at least one individual layer of dry fabrics and at least one individual layer of binder element essentially in parallel and in close contact to each other from said more than one roll;
   d) supplying the at least one layer of fabric and the at least one layer of binder element strainlessly by means of an underlying conveyor belt towards an ultrasonic unit;
   e) applying ultrasonic energy from said ultrasonic unit to said at least one layer of dry fabrics and said at least one layer of binder element to activate the binder element by means of said ultrasonic energy to create a stiff laminate;
   f) applying controlled pressure to said at least one layer of dry fabrics and said at least one layer of binder element while the binder is activated by means of said ultrasonic energy in said ultrasonic unit, to create a consolidated, stiff laminate; and
   g) cutting the consolidated, stiff laminate to a preform.

12. The process according to claim 11, wherein picking up a preform and placing the preform into a mould for further processing.

13. The process according to claim 11, wherein providing a stack of more than one layer of dry fabric and more than one layer of binder.

14. The process according to claim 11, wherein providing at least one prebindered fabric roll.

15. The process according to claim 11, wherein controlling segments of the ultrasonic unit individually by means of the tunable pressurizing means.

* * * * *